United States Patent

Sugiura et al.

[11] 4,007,971
[45] Feb. 15, 1977

[54] ANTI-SKID CONTROL SYSTEM FOR VEHICLES

[75] Inventors: Akio Sugiura, Nagoya; Atutoshi Okamoto, Toyohashi; Takahiro Nogami, Susono; Jun Ohta, Toyota, all of Japan

[73] Assignees: Nippondenso Co., Ltd., Kariya; Toyota Jidosha Kogyo Kabushiki Kaisha, Toyota, both of Japan

[22] Filed: Apr. 28, 1975

[21] Appl. No.: 572,298

Related U.S. Application Data

[63] Continuation of Ser. No. 392,775, Aug. 29, 1973, abandoned.

[30] Foreign Application Priority Data

Aug. 31, 1972 Japan .............................. 47-87279

[52] U.S. Cl. .............................. 303/109; 188/181 C
[51] Int. Cl.² .................................................. B60T 8/10
[58] Field of Search ........... 188/181 C; 303/20, 21, 303/103, 106, 109; 307/10 R; 317/5; 324/161; 340/53, 62, 263

[56] References Cited

UNITED STATES PATENTS

| | | | |
|---|---|---|---|
| 3,724,903 | 4/1973 | Okamoto et al. | 303/21 P |
| 3,764,817 | 10/1973 | Nakamura et al. | 303/21 DE X |
| 3,832,008 | 8/1974 | Leiber et al. | 303/21 BE |
| 3,834,770 | 9/1974 | Fleischer et al. | 303/21 P |

*Primary Examiner*—Stephen G. Kunin
*Attorney, Agent, or Firm*—Cushman, Darby & Cushman

[57] ABSTRACT

An anti-skid control system for vehicles wherein, in view of the fact that while it is desirable for a vehicle anti-skid control system to detect the speed of the vehicle body and the speed of the wheel to positively prevent the skidding of the vehicle, it is very difficult to detect the speed of the vehicle body, a plurality of control patterns for decreasing the wheel speed to prevent the locking of the wheels under an excessively large braking pressure are predetermined, whereby the selection among the control patterns is effected according to the conditions of the road surface detected by a vehicle body deceleration sensor and a reference wheel speed according to the selected control pattern is compared with the actual wheel speed to forcibly reduce the braking pressure when there is a tendency for the wheels to lock, thereby preventing the locking of the vehicle and hence the skidding of the vehicle without detecting the speed of the vehicle body.

8 Claims, 4 Drawing Figures

ANTI-SKID CONTROL SYSTEM FOR VEHICLES

This is a continuation of application Ser. No. 392,775 filed Aug. 29, 1973, now abandoned.

BACKGROUND OF THE INVENTION

1. Field of the Invention

The present invention relates to an anti-skid control system for vehicles designed to prevent the skidding of a vehicle caused by the locking of the wheels when the braking pressure exceeds a value which is dependent on the friction coefficient between the wheel and the rod surface upon application of the brakes while the vehicle is running.

2. Description of the Prior Art

In known anti-skid control systems of this type, while it is desirable to effect a real time control in which the speed of the vehicle body is detected to maintain the wheel speed at a value which may for example be lower than the vehicle body speed by 20%, the detection of the speed of the vehicle speed is not an easy matter. For instance, while, in an attempt to detect the speed of the vehicle body, the vehicle body may be provided with a specially designed wheel which does not assist in driving and changing the direction of the movement of the vehicle and to which no braking pressure is applied, this attempt has a drawback in the light of its practical use since it makes the system complicated and expensive to manufacture.

SUMMARY OF THE INVENTION

It is the object of the present invention to provide an anti-skid control system which meets these requirements by effecting a predictive control wherein the wheel speed is detected instead of the speed of the vehicle body to prevent the locking of the wheel. In accordance with the present invention, there is thus provided an anti-skid control system wherein a plurality of control patterns for decreasing the wheel speed to prevent the locking of the wheels under an excessively large braking pressure are predetermined so that a reference wheel speed according to the selected control pattern is compared with the actual wheel speed to forcibly reduce the braking pressure when there is a tendency for the wheels to lock, while the conditions of the road surface are determined by a deceleration sensor (hereinafter referred to as a "G-sensor") for detecting the deceleration of a vehicle body to change the control pattern according to the results of the detection by the G-sensor so as to regulate the braking pressure to always suit the friction coefficiency between the wheel and the rod surface, thereby effecting a predictive control to prevent the locking of the wheels and hence the skidding of the vehicle.

According to the present invention, the system comprises locking detecting means for generating a braking pressure reducing signal to forcibly reduce the braking pressure when the difference between a reference wheel speed according to selected one of at least two predetermined control patterns for decreasing the wheel speed and the actual wheel speed reaches a reference speed difference, braking pressure modulating means for receiving the braking pressure reducing signal from the locking detecing means to reduce the braking pressure, a G-sensor for detecing the deceleration of a vehicle body, and a pattern modification circuit for changing the control pattern of the locking detecting means according to the output signal of the G-sensor, and there is thus a great advantage in that the braking pressure can be suitably regulated to meet varying conditions of the road surface to ensure a highly reliable anti-skid control. Further, according to another form of the present invention, the system is designed to vary the reference speed difference in accordance with the rate of the deceleration and therefore, in addition to the abovementioned advantage, there is a further advantage in that the braking pressure can be regulated to more suitably meet varying conditions of the road surface.

DESCRIPTION OF THE PREFERRED EMBODIMENT

The present invention will be described in greater detail with reference to the illustrated embodiments.

Figure 1:
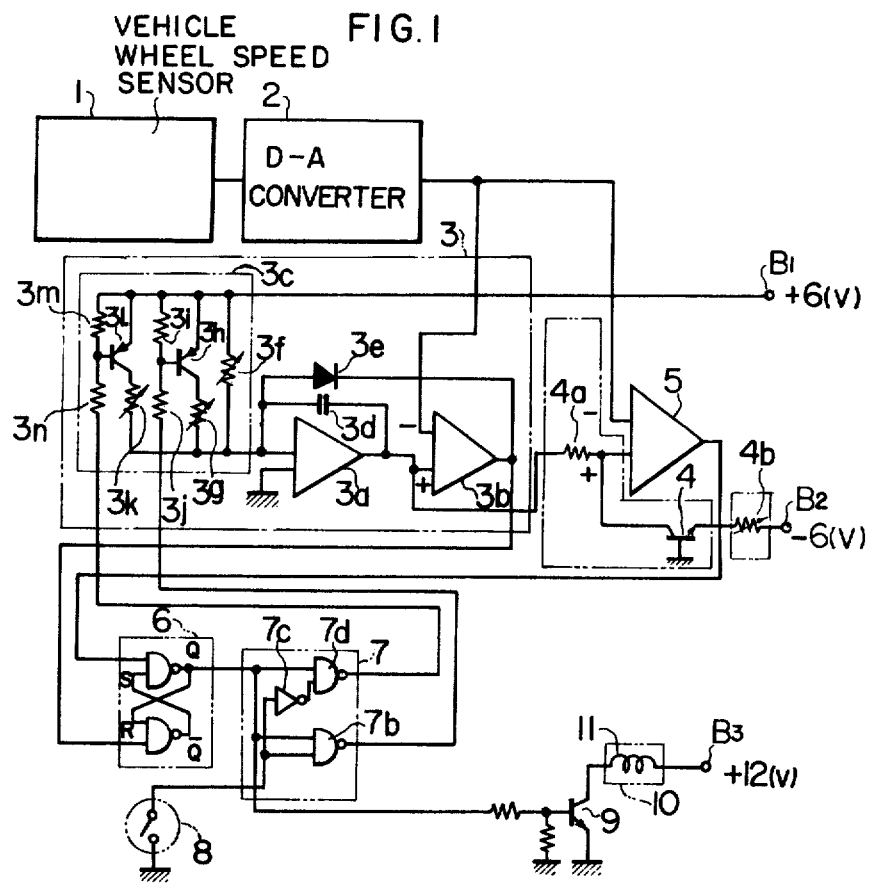
FIG. 1 is an electric wiring diagram showing an embodiment of an anti-skid control system according to the present invention.
Figure 2:
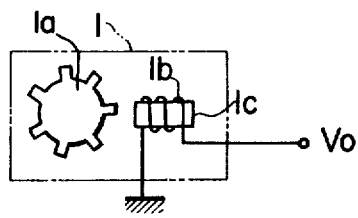
FIG. 2 is a schematic diagram showing the construction of the vehicle speed sensor used in the embodiment shown in FIG. 1.

Referring first to FIG. 1 showing an electric wiring diagram for the first embodiment of the present invention, numeral 1 designates a vehicle wheel speed sensor for generating a pulse signal having a frequency proportional to the wheel speed. The vehicle wheel speed sensor 1 is constructed as shown in FIG. 2 in which numeral 1a designates a rotating member of magnetic material which is formed with a plurality of projections on the peripheral edge thereof and which is mounted on a rotary shaft, e.g., an axle shaft correlated with the rotation of the wheel. Numeral 1b designates a generating winding wound on the outer periphery of a permanent magnet 1c disposed near the outer periphery of the rotating member 1a so that the rotation of the rotating member 1a changes the magnetic flux passing through the generating winding 1b and thus induces across the winding 1b an AC voltage having a frequency proportional to the wheel speed. This output signal is delivered to an output terminal $V_0$. Numeral 2 designates a D - A converter circuit consisting for example of an integrator circuit of known type wherein the pulse signal from the vehicle wheel speed sensor 1 is subjected to a D - A conversion to produce a DC voltage proportional to the wheel speed. Numeral 3 designates a reference voltage generating circuit comprising an operational amplifier 3a for constituting an integrator circuit, a comparator 3b, a deceleration setting circuit 3c, a capacitor 3d and a diode 3e, whereby when the DC output voltage of the D - A converter circuit 2 (hereinafter referred to as a "wheel speed voltage") is rising or in a predetermined steady state, the comparator 3b charges the capacitor 3d through the diode 3e in such a manner that the output voltage of an integrator circuit consisting of the operational amplifier 3a and the capacitor 3d becomes equal to the wheel speed voltage, whereas when the wheel speed is decreasing, the comparator 3b stops the charging of the capacitor 3d and the charge on the capacitor 3d is discharged through transistors 3h and 3l and a resistor 3f in accordance with a set deceleration which is determined by the deceleration setting circuit 3c. Consequently, a voltage corresponding to the reference wheel speed (hereinafter referred to as a "reference wheel speed voltage") is generated across the terminals of the capacitor 3d. The deceleration setting circuit 3c comprises variable resistors 3f, 3g and 3k, the transistors 3h and 3l and biasing resistors 3i, 3j, 3m and 3n, whereby a first set deceleration $g_o$ is set by the variable resistor 3f and a second set deceleration $g1$ by the variable resistor 3g and a third set deceleration $g2$ by the variable resistor 3k.

The change from one control pattern to another which results in the selection of the first, second or third set deceleration is effected by a pattern modification circuit that will be described later. Numeral 4a designates a resistor for subtracting from the reference wheel speed voltage a voltage value corresponding to a speed difference ΔV, and a current regulator circuit employing a transistor 4 is provided to maintain the current flow in the resistor 4a at a predetermined level to maintain the said voltage value constant, with the value of the current flowing in the resistor 4a being determined by the value of the variable resistor 4b. Numeral 5 designates a comparator for comparing two voltages, i.e., the wheel speed voltage and a voltage corresponding to the reference wheel speed voltage minus the speed difference ΔV, so that when the latter is greater than the former, the output signal of the comparator 5 changes from 1 to 0 to thereby set a set-reset flip-flop circuit 6 (hereinafter referred to as a "R-SFF") and thus the produce a braking pressure reducing 1 signal at its output terminal Q. When the wheel speed voltage rises again as a result of the generation of the braking pressure reducing signal so that the wheel speed voltage ≧ the reference wheel speed voltage, the output signal of the comparator 3b changes from 1 to 0 or a negative signal and therefore the R-SFF 6 is reset to change the signal at the output terminal Q from 1 to 0. Consequently, the braking pressure reducing signal is terminated and a braking pressure restoring signal is generated. Of course, the output signal of the comparator 5 changes from 0 to 1 when the wheel speed voltage ≧ the voltage corresponding to the reference wheel speed voltage minus the speed difference ΔV. However, the outputs of the comparators 3b and 5 will never have a 0 signal simultaneously. In this way, the braking pressure reducing signal and the braking pressure restoring signal are generated respectively as a 1 signal and a 0 signal at the output terminal Q of the R-SFF 6. Symbol $B_1$ designates a +6 volt power supply terminal and symbol $B_2$ designates a −6 volt power supply terminal.

Figure 3:
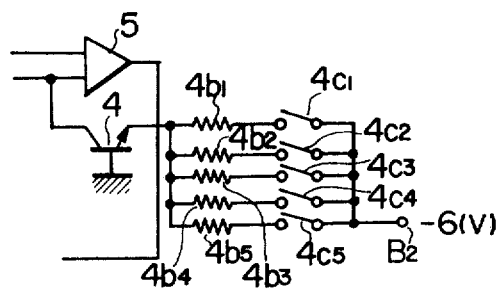
FIG. 3 is an electric wiring diagram showing a modified portion of the embodiment illustrated in FIG. 1, by which the reference speed difference is changed.

FIG. 3 shows an electric wiring diagram of a modified portion of the embodiment of FIG. 1 which utilizes the output signals of a G-sensor adapted to detect a plurality of deceleration levels. In FIG. 3, numerals $4c_1$, $4c_2$, $4c_3$, $4c_4$ and $4c_5$ designate switches which are closed selectively by the G-sensor adapted to detect five different decelerations. Numerals $4b_1$, $4b_2$, $4b_3$, $4b_4$ and $4b_5$ designate resistors whereby when a deceleration of for example 0.5 g occurs, the switch $4c_3$ is closed and the speed difference ΔV is determined by the value of the resistor $4b_3$ connected in series with the switch $4c_3$. In this case, the speed difference ΔV may be determined by the on-off operation of an analog switch effected in accordance with the output signals of the G-sensor. Numeral 7 designates a pattern modification circuit for properly changing the control pattern of the reference wheel speed $V_S$ in accordance with the selection of the first, second or third deceleration, i.e., $g_0$, $g_1$ or $g_2$. The pattern modification circuit 7 comprises NAND circuits 7a and 7b and a NOT circuit 7c.

The pattern modification circuit 7 changes the control pattern of the reference wheel speed $V_S$ in accordance with the output signal of a G-sensor 8. Assuming now that the braking pressure reducing signal is generated, a 1 signal appears at the output terminal Q of the R-SFF 6. When the G-sensor 8 is off, both inputs of the NAND circuit 7b have a 1 signal and therefore its output signal changes from 1 to 0. As a result, the transistor 3h becomes conductive and the reference wheel speed $V_S$ shows a discharging characteristic corresponding to the second set deceleration $g_1$. On the contrary, if the G-sensor 8 is on when the braking pressure reducing signal is generated, both inputs of the NAND circuit 7a have a 1 signal and therefore its output signal changes from 1 to 0. This causes the transistor 3l to become conductive and thus the reference wheel speed $V_S$ has a discharging characteristic corresponding to the third set deceleration $g_2$.

It will thus be seen that the selection among the first, second and third set decelerations $g_0$, $g_1$ and $g_2$ which determines the control pattern of the reference wheel speed $V_S$ is effected according to the various combinations of the conduction and nonconduction of the transistors 3l and 3h. Further, the G-sensor 8 is designed so that it is turned on when there is a deceleration greater than a set deceleration of for example 0.5 g, and the G-sensor 8 may be operatively associated with the switch $4c_3$ shown in FIG. 3. Numeral 10 designates electromagnetically operated braking pressure modulating means whose mechanical construction is not shown excepting its electromagnetic coil 11. When the electromagnetic coil 11 is not energized, the normal braking operation can be performed without obstructing the artificial braking operation effected by the depression of the brake pedal by the driver. When current is supplied to the electromagnetic coil 11 by the braking pressure reducing signal, the electromagnetic force of the electromagnetic coil 11 operates for example a three-way valve and further actuates servo means to forcibly reduce the braking pressure applied to the wheel even the braking pedal is being depressed by the driver. Numeral 9 designates a power transistor to switch on and off the supply of current to the electromagnetic coil 11 and its base is connected to the output terminal Q of the R-SFF 6. The other end of the electromagnetic coil 11 is connected to a power supply terminal $B_3$ (+12 volts).

Figure 4:
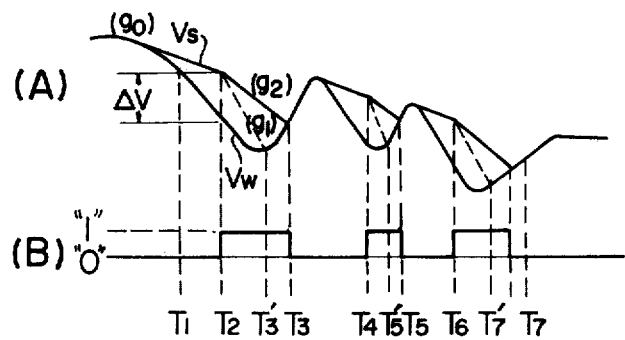
FIG. 4 is a characteristic diagram useful for explaining the operation of the system according to the present invention.

With the construction described above, the operation of the system according to the present invention will be explained with reference to the characteristic diagram shown in FIG. 4. FIG. 4a illustrates the time relationship of the wheel speed $V_W$ and the reference wheel speed $V_S$ and FIG. 4b shows the braking pressure reducing signals for reducing the braking pressure. In the control operation of the wheel speed $V_W$, the application of a braking pressure to the wheel causes the wheel speed $V_W$ to drop with a deceleration determined in accordance with the amount of the braking pressure applied, while the reference wheel speed $V_S$ drops firstly in accordance with a predetermined control pattern. When the wheel speed $V_W$ drops below the reference wheel speed $V_S$ minus the speed difference ΔV (e.g., 3 Km/h), a braking pressure reducing signal is generated to actuate the braking pressure modulating means 10 and thereby to forcibly reduce the braking pressure applied to the wheel. When the wheel speed $V_W$ eventually rises again to become equal to the reference wheel speed $V_S$, the braking pressure reducing signal is terminated and a braking pressure restoring signal is generated to reapply the braking pressure to the wheel. The control patterns of the reference wheel speed $V_S$ are predetermined so that the reference wheel speed $V_S$ gradually drops for example with the first set deceleration $g_0$ (1.0 g), the second set deceleration $g_1$ (4.0 g) or the third set deceleration $g_2$ (2.0 g) along with the deceleration of the wheel. Here, $g$ is the force of gravity. Further, as shown in FIG. 4(A), there are at least two predetermined control patterns and the selection between the control patterns is effected in accordance with the output signal of the G-sensor 8. In other words, the selection between the control patterns of the reference wheel speed $V_S$ is effected depending on whether the declaration of the vehicle body is graeater or less than a predetermined deceleration of for example 0.5 g. When the braking pedal is depressed to apply a braking pressure to the wheel at a time $T_1$ in FIG. 4(A), the wheel speed $V_W$ drops with a deceleration corresponding to the applied braking pressure, while the reference wheel speed $V_S$ drops firstly with the first set deceleration $g_0$. When the wheel speed $V_W$ drops below the reference wheel speed $V_S$ minus the speed difference ΔV at a time $T_2$, as shown in FIG. 4(B), a 1 signal or a braking pressure reducing signal is generated so that the braking pressure modulating means 10 is actuated to forcibly reduce the braking pressure applied to the wheel. During the time interval between the generation of the first braking pressure reducing signal at the time $T_2$ and the generation of a 0 signal or a braking pressure restoring signal, the reference wheel speed $V_S$ drops with either one of the second set deceleration $g_1$ or the third set deceleration $g_2$. In this case, whether the reference wheel speed $V_S$ drops with the second set deceleration $g_1$ or the third set deceleration $g_2$ depends on the ouput signal of the G-sensor 8. The braking pressure restoring signal is generated when the wheel speed $V_W$ that has risen as the result of the generation of the braking pressure reducing signal becomes equal to the reference wheel speed $V_S$ at a time $T_3$ or $T_3$'. Thereafter, when the wheel speed $V_W$ rises further, the reference wheel speed $V_S$ also rises along with the wheel speed $V_W$. In the next cycle following the time $T_3$ or $T_3$' at which the braking pressure restoring signal was generated, the braking pressure restoring signal is terminated at a time $T_4$ and thus the braking pressure reducing signal is again generated. After the generation of this braking pressure reducing signal, a similar operation as in the previous cycle is repeated to effect the selection of the set deceleration for the reference wheel speed $V_S$.

It should be appreciated that the present invention is not intended to be limited to the illustrated and described embodiments, since many modifications and changes may be made without departing in any way from the spirit and scope of the present invention. For example, the number of predetermined control patterns is not limited to two and several control patterns may be predetermined. Further, instead of a G-sensor adapted to be turned on and off, that is, a sensor adapted to detect a single deceleration, one which is capable of detecting a plurality of decelerations may be used to ensure a more accurate control. Moreover, by using a plurality of speed differences ΔV, a control with greatly improved accuracy and reliability can be ensured.

We claim:
1. An anti-skid control system for vehicles comprising:
   a wheel sensor for detecting a wheel speed,
   a reference wheel speed generating circuit for producing a reference wheel speed signal which decreases in accordance with a predetermined control pattern to approximate a vehicle body speed during a braking action and which is derived from a wheel speed signal generated by said wheel sensor,
   comparison means for generating a relaxation signal when a difference between said wheel speed signal and reference signal reaches a set-up speed width,
   braking pressure modification means for reducing braking pressure by receiving the relaxation signal from said comparison means;
   road surface detecting means for generating a detection signal when the friction coefficient between a road surface and a wheel becomes less than a predtermined level, and a pattern modification circuit, connected to said road surface detecting means, said comparison means and said reference wheel speed generating circuit, for first setting up a predetermined downward gradient as the gradient of said reference wheel speed signal at the beginning thereof when said reference wheel speed signal corresponds to the wheel speed, said predetermined gradient being independent of deceleration, and second, setting up either a steeper or a slower gradient, after said braking pressure reducing signal has been generated, in accordance with whether said detection signal is generated, and
   variation means for successively varying said set-up speed width in response to the magnitude of the vehicle body deceleration.

2. An anti-skid control system for vehicles according to claim 1, further comprising, as said road surface detecting means, a vehicle body deceleration sensor for generating a detection signal when a deceleration of the vehicle becomes less than a predetermind level 3. An anti-skid control system for vehicles according to claim 1, further comprising means for making said comparison means have a hysteresis.

4. An anti-skid control system for vehicles comprising a wheel sensor for detection of a wheel speed,
   a reference wheel speed generating circuit for producing a reference wheel speed signal which is reduced in accordance with a predetermined control pattern to approximate a vehicle body speed during a braking action and which is derived from a wheel speed signal generated by said wheel sensor,
   dividing means for dividing said reference wheel speed signal at a set-up rate,
   a comparison means for generating a relaxation signal when said wheel speed signal is less than a divided signal from said dividing means,
   a braking pressure modification means for decreasing a brakepressure upon receiving said relaxation signal,
   a road surface detecting means for generating a detection signal when the friction coefficient between a road surface and a wheel decreases to less than a predetermined level, and a pattern modification circuit, connected to said road surface detecting means, said comparison means and said reference wheel speed generating circuit, for first setting up a predetermined downward gradient as the gradient of said reference wheel speed signal at the beginning thereof when said reference wheel speed signal corresponds to the wheel speed, said predetermined gradient being independent of deceleration, and second, setting up either a steeper or a slower gradient, after said braking pressure reducing signal has been generated, in accordance with whether said detection signal is generated, and variation means for successively varying the set-up width of said dividing means in response to the magnitude of said vehicle body deceleration.

5. An anti-skid control system for vehicles according to claim 4, further comprising, as said road surface detecting means, a vehicle body deceleration sensor for generating a detection signal when a deceleration of the vehicle becomes less than a predetermined level.

6. An anti-skid control system for vehicles according to claim 5, wherein said vehicle body deceleration sensor is closed when the vehicle deceleration exceeds a predetermined level, to establish said control pattern in which said reference wheel speed signal decreases steeply.

7. An anti-skid control system for vehicles according to claim 4, further comprising means for making said comparison means have a hysteresis.

8. An anti-skid control system for vehicles according to claim 4, wherein said comparison means comprises a comparator for generating a comparison signal when said wheel speed signal decreases less than a divided signal of said dividing means, and a circuit for generating a relaxation signal during a time from the generation of the comparison signal of the comparator until said wheel speed signal reaches said reference wheel speed signal.

* * * * *